Figure 1:
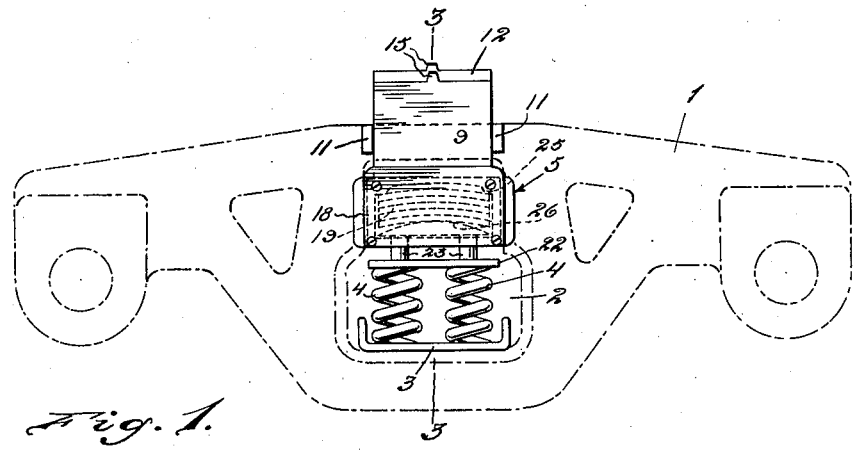

March 26, 1929.　　M. H. MARTIN　　1,706,494

TRUCK SIDE BEARING STRUCTURE

Filed June 3, 1927

Mark H. Martin
INVENTOR.

BY

ATTORNEY

WITNESS

Patented Mar. 26, 1929.

1,706,494

UNITED STATES PATENT OFFICE.

MARK H. MARTIN, OF BALTIMORE, MARYLAND, ASSIGNOR TO T. H. SYMINGTON & SON, INC., OF BALTIMORE, MARYLAND, A CORPORATION OF MARYLAND.

TRUCK SIDE-BEARING STRUCTURE.

Application filed June 3, 1927. Serial No. 196,343.

The invention relates to railway car trucks and has special reference to side bearing structures.

The principal object of the invention, generally stated, is to provide a side bearing structure located substantially in line with and above the side frames, these side bearings being designed to carry the load which will therefore be more evenly or uniformly distributed than is the case under the ordinary system in which the load comes upon center bearings, the location of the side bearings above the side frames greatly reducing, if not entirely eliminating, bending moments in the truck bolster and bringing the strains upon the portions of the mechanism best adapted to withstand them without danger of injury to any of the parts.

An important object of the invention is to provide a truck having a side bearing structure arranged as indicated and embodying a bolster equipped with absorption means including combined friction and resilient means acting to increase the spring deflection, providing increased capacity and to change or modify the period of oscillation of coacting or companion spring means supporting the bolster, the later mentioned feature resulting in the breaking up or preventing of synchronization, thereby eliminating car roll and any tendency toward the development of side sway.

Another object of the invention is to provide a truck structure in which the location and arrangement of the side bearings to sustain the load at four points above the truck side frames causes the center bearing and coacting center plate to function only as guide means during relative swivelling movement of the truck and body bolsters and as means providing a driving connection between the truck and body bolsters.

A further object of the invention is to provide a side bearing and absorption means of this character so constructed and having a degree of clearance at certain points as to permit shimming of the parts for taking up wear and to compensate for any loss in elasticity of the truck springs or of the springs forming or constituting the absorption means.

A still further object of the invention is to provide a side bearing structure embodying rollers coacting with depending elements on the body bolster and with bearing members mounted above and slidably engaged with the side frames in embracing relation thereto, the bearing members being supported directly upon the truck bolster at opposite sides of each side frame and immediately adjacent thereto, means being also provided cooperating with side frames and with said bearing members for guiding the same during deflection of the springs, all of the parts being positively maintained in the proper operative relation at all times and prevented from displacement.

An additional object is to provide a structure of this character which will be comparatively simple and inexpensive to manufacture, easy to install, positive in action, efficient and durable in service, and a general improvement in the art.

Figure 2:
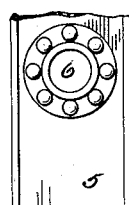
Figure 2:
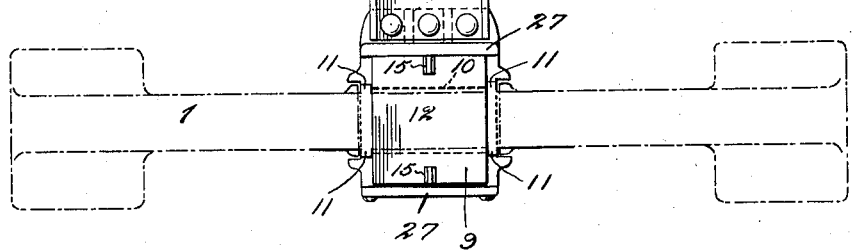
Figure 3:
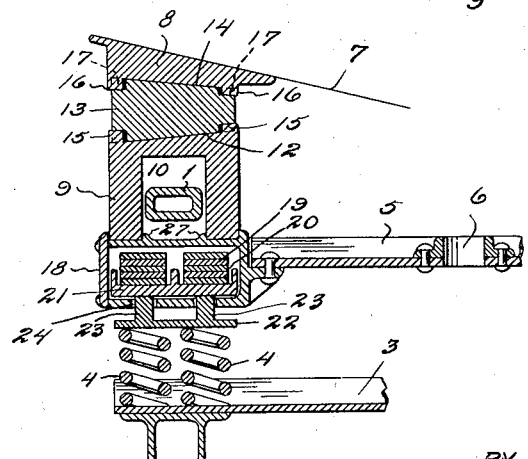

To the attainment of the foregoing and other objects and advantages, the invention preferably consists in the details of construction and the arrangement and combination of parts to be hereinafter more fully described and claimed, and illustrated in the accompanying drawing in which:

Figure 1 is a side elevation of a truck side frame and bolster illustrating the side bearing structure applied thereto in accordance with the invention, Figure 2 is a top plan view, and Figure 3 is a vertical cross section taken on the line 3—3 of Figure 1.

Referring more particularly to the drawing, the numeral 1 designates a truck side frame provided with the usual window opening 2 within the lower portion of which is engaged one end of the spring plank 3 which carries truck springs 4 for supporting the bolster 5. This bolster is represented as provided with a center bearing 6 with which may be connected some suitable coacting bearing element carried by the body bolster 7, the body bolster being provided at each end with a depending bearing element 8. The structure is of course the same at both sides of the truck though only one side is illustrated inasmuch as it is entirely sufficient to explain the invention clearly.

The side bearing structure is represented as comprising a bearing member 9 here represented as of substantially inverted U-shape and embracingly engaged upon the upper portion of each side frame, the opening 10 within the bearing member 9 being of such dimensions as to permit movement of the parts during maximum deflection of the springs 4, and auxiliary springs to be described, without interference with the side frames. It is preferable to provide guide ribs 11, or their equivalent, upon the side frames coacting with each bearing member 9 for the purpose of preventing displacement of the latter longitudinally of the side frames, these ribs also guiding the bearing member 9 during vertical sliding movement thereof when spring deflection occurs. The member 9 has an inclined top surface 12 constituting a seat for a preferably tapered or frusto-conical roller 13 which also engages against the inclined bottom surface 14 of the depending bearing element 8 carried by the body bolster. It is of course necessary to provide some means or other for maintaining the proper relation between the members 9 and 8 and the roller 13, for which reason I have disclosed teeth 15 rising from the surface 12 and other teeth 16 extending downwardly from the surface 14, these teeth being received within pockets 17 in the ends of the roller 13. Clearly, when relative swivelling movement of the truck and body bolsters occurs during weaving of a car or passage thereof over curved track, the interengaging teeth and pockets will maintain the proper relation of the parts at all times and effect return thereof to normal position.

A very important feature of the invention resides in the provision of absorption mechanism acting in series with the truck springs. In carrying this out I prefer to form each end of the truck bolster as or provide it with a casing 18 within which are mounted any desired number of groups or banks of elongated plate or leaf springs 19 held within compartments 20 in a spring carrier 21 which is capable of vertical movement within the casing. Instead of engaging directly against the underside of the bolster, the springs 4 support or are engaged against a combined spring seat and follower 22 here represented as having upstanding lugs 23 slidable through openings 24 in the bottom of the casing 18 and engaging against the underside of the carrier 21. The leaf springs 19 preferably extend transversely of the bolster and their ends engage against ledges or shoulders 25. The top surface 26 of the carrier 21 is convexed as clearly indicated in Figure 1 so that there will be a tendency to flex the springs 19 upwardly, the underside of the top wall of the casing 18 being suitably recessed to permit this action without interference. The broad principles involved in this absorption mechanism are set forth in my co-pending application Serial No. 131,004 filed August 23rd, 1926. Clearly, the exact construction of the casing 18 is immaterial except that some portion thereof must be removable to permit installation of the carrier and plate springs. Obviously, various arrangements for this purpose will suggest themselves to the skilled designer. It will be observed that in the present instance the casing 18 is represented as formed separate from the bolster 5 and secured thereto but it should be understood that the structure may be integral as set forth in said co-pending application if such is found advisable or preferable for any reason such as convenient to the manufacturer. While it may not be of vital importance to do so, I prefer that the top of the casing 18 be provided with a plurality of upstanding ribs 27 which will act to stiffen it but which will perform the more important function of maintaining the bearing member 9 in proper position inasmuch as these ribs engage against the walls of the opening 10 and the outer surfaces of the member 9.

In the operation, it will be apparent that the load is sustained by the side bearings and that the weight comes upon the ends of the bolster, thus eliminating bending strains and also torsional strains, the latter being true for the reason that the bearing member 9 is substantially of the same width as the end of the bolster, there being large areas of contact which will avoid concentration of loads at any localized points. The absence of bending strains permits use of a truck bolster of much lighter weight than is ordinarily possible, the transverse or tie portion of the bolster serving simply to transmit the pull of the king pin to the side frames, or the reverse. The bearing members 9 are held in proper relation to the truck bolster by the ribs 27 and in guided relation to the side frame by the ribs 11 so that undesired displacement will be entirely avoided. Under load conditions the truck springs 4 are of course deflected in the usual manner as are also the auxiliary or absorption springs 19. The latter have a different period of oscillation from the former and there will be not only an increase in capacity, making it possible to sustain heavier loads, but also a positive breaking up of synchronization so that car roll and side sway will be prevented.

From the foregoing description and a study of the drawing it will be apparent that I have thus provided a truck structure embodying all the advantageous characteristics set forth. It will be observed that the general design may follow the usual practice at least to a great extent and that there is nothing radical or revolutionary in the invention such as would preclude its employment in connection with otherwise standard equipment. The arrangement is such that there will be maximum efficiency coupled with durability. It is really believed that the construction, operation and advantages will be or should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a railway car truck, side frames, a truck bolster mounted for vertical movement therein and restrained from longitudinal movement, spring means supporting the bolster within the side frames, and a side bearing structure located above and in line with the side frames for coaction with depending bearing elements carried by a body bolster.

2. In a railway car truck, side frames, a truck bolster, spring means supporting the bolster within the side frames, and a side bearing structure located above and in line with the side frames for coaction with depending bearing elements carried by a body bolster, the side bearing structure being load sustaining and cooperating with the side frame to prevent lateral motion of the truck bolster.

3. In a railway car truck, side frames, a truck bolster, spring means supporting the bolster within the side frames, and a side bearing structure located above and in line with the side frames for coaction with depending bearing elements carried by a body bolster, the side bearing structure being load sustaining and restraining the truck bolster against longitudinal movement and embodying rollers providing for swivelling movement of the truck.

4. In a railway car truck, side frames, a truck bolster, spring means supporting the bolster within the side frames, and a side bearing structure located above and in line with the side frames for coaction with depending bearing elements carried by a body bolster, the side bearing structure including a bearing member arranged in straddling relation to the side frame and in engagement with the sides thereof and engaging upon the bolster throughout substantially the width thereof.

5. In a railway car truck, side frames, a truck bolster, spring means supporting the bolster within the side frames, a side bearing structure located above and in line with the side frames for coaction with depending bearing elements carried by a body bolster, and absorption means located immediately above and acting in series with the bolster supporting spring means.

6. In a railway car truck, side frames, a truck bolster, springs within the side frames supporting the bolster, and load sustaining side bearing structures comprising a bearing member arranged above and in straddling relation to each side frame and engaging upon the top of the bolster, and a roller on said bearing member for engagement with a depending bearing element carried by a body bolster, the bearing member engaging against the sides of the side frame for preventing lateral motion of the truck bolster.

7. In a railway car truck, side frames, a truck bolster, springs within the side frames supporting the bolster, and load sustaining side bearing structures comprising a bearing member arranged above and in straddling relation to each side frame and engaging upon the top of the bolster, a roller on said bearing member for engagement with a depending bearing element carried by a body bolster, and means on the bearing member engaging the side frame for guiding the latter during vertical movement and preventing transverse displacement thereof.

8. In a railway car truck, side frames, a truck bolster, springs within the side frames supporting the bolster, and load sustaining side bearing structures comprising a bearing member arranged above and in straddling relation to each side frame and engaging upon the top of the bolster, a roller on said bearing member for engagement with a depending bearing element carried by a body bolster, and means on the top of the bolster extending transversely thereof and engaging the outer and inner faces of the bearing member for preventing displacement of the latter longitudinally of the bolster.

9. In a railway car truck, side frames, a truck bolster, springs within the side frames supporting the bolster, and load sustaining side bearing structures comprising a bearing member arranged above and in straddling relation to each side frame and engaging upon the top of the bolster, a roller on said bearing member for engagement with a depending bearing element carried by a body bolster, guide ribs on the side frame engaging the bearing member for preventing movement of the latter in a transverse direction, and ribs on the truck bolster cooperating with the bearing member for preventing displacement of the latter longitudinally of the truck bolster.

10. In a railway car truck, side frames, a truck bolster, supporting springs for the truck bolster, the truck bolster having each end formed as a casing, absorption spring means within the casing, an operative connection between the first named springs and said absorption spring means, and a load sustaining side bearing structure mounted above and substantially in line with each side frame and engaged upon the truck bolster, the side bearing structure being adapted for cooperation with a bearing element depending from a body bolster.

11. In a railway car truck, side frames, a truck bolster, spring means supporting the truck bolster, and a side bearing structure at each side of the truck including a bearing member located above and substantially in line with the side frame and having an opening receiving the latter whereby to be capable of vertical movement with respect to the side frame, the bearing member having its lower portion engaging upon the top of the bolster at opposite sides of the side frame, a roller mounted upon the top of the bearing member adapted for coaction with a depending bearing element carried by a body bolster, and coacting means on the roller, said bearing member and bearing element for maintaining a certain relation of the parts at all positions thereof.

12. In a railway car truck embodying side frames, a truck bolster and spring means supporting the truck bolster within the side frames, the combination of load sustaining side bearing structures located above the side frames and engaging upon the end portions of the bolster, and auxiliary spring means located within the ends of the bolster and acting in series with the bolster supporting springs to constitute absorption mechanism.

In testimony whereof I affix my signature.

MARK H. MARTIN.